United States Patent
Radu

(10) Patent No.: US 10,761,965 B2
(45) Date of Patent: Sep. 1, 2020

(54) DETECTING METHOD CALLS BASED ON STACK TRACE DATA

(71) Applicants: Atlassian Pty Ltd, Sydney New South Wales (AU); Atlassian, Inc., San Francisco, CA (US)

(72) Inventor: Alex Radu, Blaxland (AU)

(73) Assignees: Atlassian Pty Ltd., Sydney, New South Wales (AU); Atlassian, Inc., San Francisco, CA (US)

( * ) Notice: Subject to any disclaimer, the term of this patent is extended or adjusted under 35 U.S.C. 154(b) by 0 days.

(21) Appl. No.: 16/206,426

(22) Filed: Nov. 30, 2018

(65) Prior Publication Data

US 2020/0104238 A1    Apr. 2, 2020

Related U.S. Application Data

(60) Provisional application No. 62/738,558, filed on Sep. 28, 2018.

(51) Int. Cl.
  *G06F 11/36*    (2006.01)
  *G06F 16/901*   (2019.01)

(52) U.S. Cl.
  CPC ...... *G06F 11/3636* (2013.01); *G06F 11/3644* (2013.01); *G06F 16/9027* (2019.01)

(58) Field of Classification Search
  CPC ............. G06F 11/3636; G06F 11/3644; G06F 16/9027
  USPC ........................................................ 717/128
  See application file for complete search history.

(56) References Cited

U.S. PATENT DOCUMENTS

| | | | | |
|---|---|---|---|---|
| 6,230,313 | B1 * | 5/2001 | Callahan, II | G06F 11/3404 714/35 |
| 6,237,114 | B1 * | 5/2001 | Wookey | G06F 11/0748 714/47.2 |
| 6,282,701 | B1 * | 8/2001 | Wygodny | G06F 11/3466 702/183 |
| 6,377,945 | B1 * | 4/2002 | Risvik | G06F 16/3346 |
| 6,598,012 | B1 * | 7/2003 | Berry | G06F 11/3466 702/187 |
| 6,604,210 | B1 * | 8/2003 | Alexander, III | G06F 11/3636 714/39 |
| 6,658,652 | B1 * | 12/2003 | Alexander, III | G06F 9/5016 707/999.202 |

(Continued)

OTHER PUBLICATIONS

L. Adhianto, S. Banerjee, M. Fagan, M. Krentel, G. Marin, J. Mellor-Crummey, and N. R. Tallent. 2010. HPCTOOLKIT: tools for performance analysis of optimized parallel programs http://hpctoolkit.org. Concurr. Comput.?: Pract. Exper. 22, 6 (Apr. 2010), 685-701. (Year: 2010).*

(Continued)

*Primary Examiner* — Andrew M. Lyons
(74) *Attorney, Agent, or Firm* — Hickman Palermo Becker Bingham LLP

(57) ABSTRACT

In an embodiment, a computer-implemented method for improving computer processing efficiency comprises using a main processing thread, in response to detecting an error in one or more function calls, tracing the one or more function calls at runtime and collecting stack trace data; and using a background processing thread, generating and displaying a function call tree based on the stack trace data.

17 Claims, 4 Drawing Sheets

300

302 USING A MAIN PROCESSING THREAD, IN RESPONSE TO DETECTING AN ERROR IN ONE OR MORE FUNCTION CALLS, TRACING THE ONE OR MORE FUNCTION CALLS AT RUNTIME AND COLLECTING STACK TRACE DATA

304 USING A BACKGROUND PROCESSING THREAD, GENERATING AND DISPLAYING A FUNCTION CALL TREE BASED ON THE STACK TRACE DATA

(56) References Cited

U.S. PATENT DOCUMENTS

| | | | | |
|---|---|---|---|---|
| 6,728,955 | B1* | 4/2004 | Berry | G06F 11/3409 714/E11.192 |
| 6,751,789 | B1* | 6/2004 | Berry | G06F 11/3466 714/35 |
| 8,108,339 | B2* | 1/2012 | Bezar | G06F 16/2282 707/610 |
| 8,117,599 | B2* | 2/2012 | Edmark | G06F 11/3612 717/127 |
| 8,271,999 | B2* | 9/2012 | Jones | G06F 11/3612 719/320 |
| 8,336,033 | B2* | 12/2012 | Schmelter | G06F 11/3636 717/127 |
| 8,504,994 | B2* | 8/2013 | Golender | G06F 9/547 717/128 |
| 10,073,760 | B2* | 9/2018 | Golender | G06F 11/366 |
| 2003/0088854 | A1* | 5/2003 | Wygodny | G06F 11/3636 717/130 |
| 2005/0028145 | A1* | 2/2005 | Kang | G06F 11/3636 717/128 |
| 2005/0204048 | A1* | 9/2005 | Pujol | G06F 9/46 709/229 |
| 2005/0223368 | A1* | 10/2005 | Smith | G06F 11/3636 717/128 |
| 2007/0283338 | A1* | 12/2007 | Gupta | G06F 11/36 717/154 |
| 2007/0288908 | A1* | 12/2007 | Cain | G06F 11/3466 717/130 |
| 2008/0010526 | A1* | 1/2008 | Modani | G06F 11/36 714/30 |
| 2008/0120292 | A1* | 5/2008 | Sundaresan | G06F 16/355 |
| 2008/0127109 | A1* | 5/2008 | Simeon | G06F 11/3409 717/128 |
| 2008/0134148 | A1* | 6/2008 | Clark | G06F 11/3636 717/128 |
| 2008/0244531 | A1* | 10/2008 | Schmelter | G06F 11/3636 717/128 |
| 2009/0178036 | A1* | 7/2009 | Levine | G06F 11/3476 718/1 |
| 2010/0017584 | A1* | 1/2010 | Jones | G06F 11/3612 712/227 |
| 2010/0017789 | A1* | 1/2010 | DeWitt, Jr. | G06F 11/3466 717/126 |
| 2010/0095278 | A1* | 4/2010 | Nageshappa | G06F 11/3636 717/128 |
| 2010/0229157 | A1* | 9/2010 | Ergan | G06F 11/0748 717/128 |
| 2010/0251210 | A1* | 9/2010 | Amaral | G06F 11/3604 717/105 |
| 2011/0283263 | A1* | 11/2011 | Gagliardi | G06F 11/3612 717/130 |
| 2012/0144374 | A1* | 6/2012 | Gallagher | G06F 11/3466 717/128 |
| 2012/0151453 | A1* | 6/2012 | Finking | G06F 11/3612 717/130 |
| 2013/0132780 | A1* | 5/2013 | Bohnet | G06F 11/3636 714/45 |
| 2013/0198572 | A1* | 8/2013 | Han | G06F 11/3636 714/38.1 |
| 2015/0347220 | A1* | 12/2015 | Hermany | G06F 11/0742 714/48 |
| 2015/0378724 | A1* | 12/2015 | Balachandran | G06F 11/3476 717/123 |
| 2016/0011755 | A1* | 1/2016 | Douek | G06F 9/455 715/704 |
| 2016/0098334 | A1* | 4/2016 | Hariharakrishnan | G06F 11/3013 702/186 |
| 2016/0306689 | A1* | 10/2016 | Jain | G06F 11/0742 |
| 2016/0357516 | A1* | 12/2016 | Kogel | G06F 11/3612 |
| 2017/0031738 | A1* | 2/2017 | Maeda | G06F 11/3612 |
| 2017/0286260 | A1* | 10/2017 | Baartmans | G06F 9/466 |
| 2018/0101466 | A1* | 4/2018 | O'Dowd | G06F 11/3636 |
| 2018/0157469 | A1* | 6/2018 | Conole | G06F 8/41 |
| 2019/0057200 | A1* | 2/2019 | Sabag | G06F 21/316 |
| 2019/0065339 | A1* | 2/2019 | Mola | G06F 11/3612 |
| 2019/0303270 | A1* | 10/2019 | Hoermann | G06F 11/3644 |

OTHER PUBLICATIONS

L. Adhianto, J. Mellor-Crummey and N. R. Tallent, "Effectively Presenting Call Path Profiles of Application Performance," 2010 39th International Conference on Parallel Processing Workshops, San Diego, CA, 2010, pp. 179-188. (Year: 2010).*

L. Adhianto and P. Taffet, "Addressing Challenges in Visualizing Huge Call-Path Traces," 2016 45th International Conference on Parallel Processing Workshops (ICPPW), Philadelphia, PA, 2016, pp. 319-328. (Year: 2016).*

A. R. Dalton and J. O. Hallstrom, "A Toolkit for Visualizing the Runtime Behavior of TinyOS Applications," 2008 16th IEEE International Conference on Program Comprehension, Amsterdam, 2008, pp. 43-52. (Year: 2008).*

Duke University, "TrieAutocomplete," Spring 2016, last retrieved from https://www2.cs.duke.edu/courses/compsci201/spring16/autocomplete/trie.html on Jan. 4, 2020. (Year: 2016).*

P. Gralka, C. Schulz, G. Reina, D. Weiskopf and T. Ertl, "Visual Exploration of Memory Traces and Call Stacks," 2017 IEEE Working Conference on Software Visualization (VISSOFT), Shanghai, 2017, pp. 54-63. (Year: 2017).*

J. R. Larus, "Efficient program tracing," in Computer, vol. 26, No. 5, pp. 52-61, May 1993. (Year: 1993).*

M. T. Lazarescu and L. Lavagno, "Dynamic Trace-Based Data Dependency Analysis for Parallelization of C Programs," 2012 IEEE 12th International Working Conference on Source Code Analysis and Manipulation, Trento, 2012, pp. 126-131. (Year: 2012).*

D. Liu and S. Xu, "MuTT: A Multi-Threaded Tracer for Java Programs," 2009 Eighth IEEE/ACIS International Conference on Computer and Information Science, Shanghai, 2009, pp. 949-954. (Year: 2009).*

M. Perscheid, B. Steinert, R. Hirschfeld, F. Geller and M. Haupt, "Immediacy through Interactivity: Online Analysis of Run-time Behavior," 2010 17th Working Conference on Reverse Engineering, Beverly, MA, 2010, pp. 77-86. (Year: 2010).*

K. Y. Phang, J. S. Foster and M. Hicks, "Expositor: Scriptable time-travel debugging with first-class traces," 2013 35th International Conference on Software Engineering (ICSE), San Francisco, CA, 2013, pp. 352-361. (Year: 2013).*

C. Pungila, "A Bray-Curtis Weighted Automaton for Detecting Malicious Code Through System-Call Analysis," 2009 11th International Symposium on Symbolic and Numeric Algorithms for Scientific Computing, Timisoara, 2009, pp. 392-400. (Year: 2009).*

J. Quante, "Online Construction of Dynamic Object Process Graphs," 11th European Conference on Software Maintenance and Reengineering (CSMR'07), Amsterdam, 2007, pp. 113-122. (Year: 2007).*

S. Yata, K. Morita, M. Fuketa and J. Aoe, "Customized Tries for Weighted Key Completion," 2010 Second International Conference on Computer Engineering and Applications, Bali Island, 2010, pp. 286-290. (Year: 2010).*

J. Zhou, Z. Chen, J. Wang, Z. Zheng and M. R. Lyu, "A Data Set for User Request Trace-Oriented Monitoring and its Applications," in IEEE Transactions on Services Computing, vol. 11, No. 4, pp. 699-712, Jul. 1-Aug. 2018. (Year: 2018).*

Ravindranath et al., "AppInsight: Mobile App Performance Monitoring in the Wild", 10th USENIX Symposium on Operating Systems Design and Implementation OSDI dated 2012, 14 pages.

Forrest et al., "The Evolution of System-call Monitoring", dated 2008, 13 pages.

Feng et al., "Anomaly Detection Using Call Stack Information", dated 2003, 14 pages.

CSCI, "The Stack Trace and Debugging", dated 2015, 7 pages.

* cited by examiner

302 USING A MAIN PROCESSING THREAD, IN RESPONSE TO DETECTING AN ERROR IN ONE OR MORE FUNCTION CALLS, TRACING THE ONE OR MORE FUNCTION CALLS AT RUNTIME AND COLLECTING STACK TRACE DATA

304 USING A BACKGROUND PROCESSING THREAD, GENERATING AND DISPLAYING A FUNCTION CALL TREE BASED ON THE STACK TRACE DATA

DETECTING METHOD CALLS BASED ON STACK TRACE DATA

BENEFIT CLAIM

This application claims the benefit under 35 U.S.C. 119(e) of provisional application 62/738,558, filed Sep. 28, 2018, the entire contents of which are hereby incorporated by reference for all purposes as if fully set forth herein.

TECHNICAL FIELD

The present disclosure generally relates to improved systems, methods, computer software and hardware in the field of computer system performance monitoring and in particular to detecting when computer programs appear to be generating excessive or large numbers of method calls to databases or other systems. Another technical field is analysis of stack traces that computer systems generate when processors load and execute instructions.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Improving the speed, responsiveness and efficiency of a distributed computer system, and applications executing on such systems, is a continuing goal of professional systems managers. However, accurately measuring the utilization of local and external resources of a complex computer program application can be challenging. Even when the design, architecture and structure of a program is thoroughly engineered in advance, actual code-writing may introduce unanticipated performance problems. Often these problems are extremely difficult to trace back to particular program elements such as methods or subroutines. For example, a systems analyst may notice that an application is putting a greater than expected load on external resources, such as numerous database calls, but in practice may have difficulty isolating which specific segment of code or method is the source of the problem.

When streamlining the performance of applications, identifying the precise location of errors or problematic issues in method calls is difficult because poorly performing patterns may only appear for certain customers and data shapes. Classic instrumentation techniques impose substantial overhead, and may negatively affect performance even more, when enabled. Therefore, there is a need for a faster way of accurately detecting and tracking errors in method calls.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrate a method or algorithm for improving method call detection using stack traces, in an embodiment.

DETAILED DESCRIPTION

Figure 1:
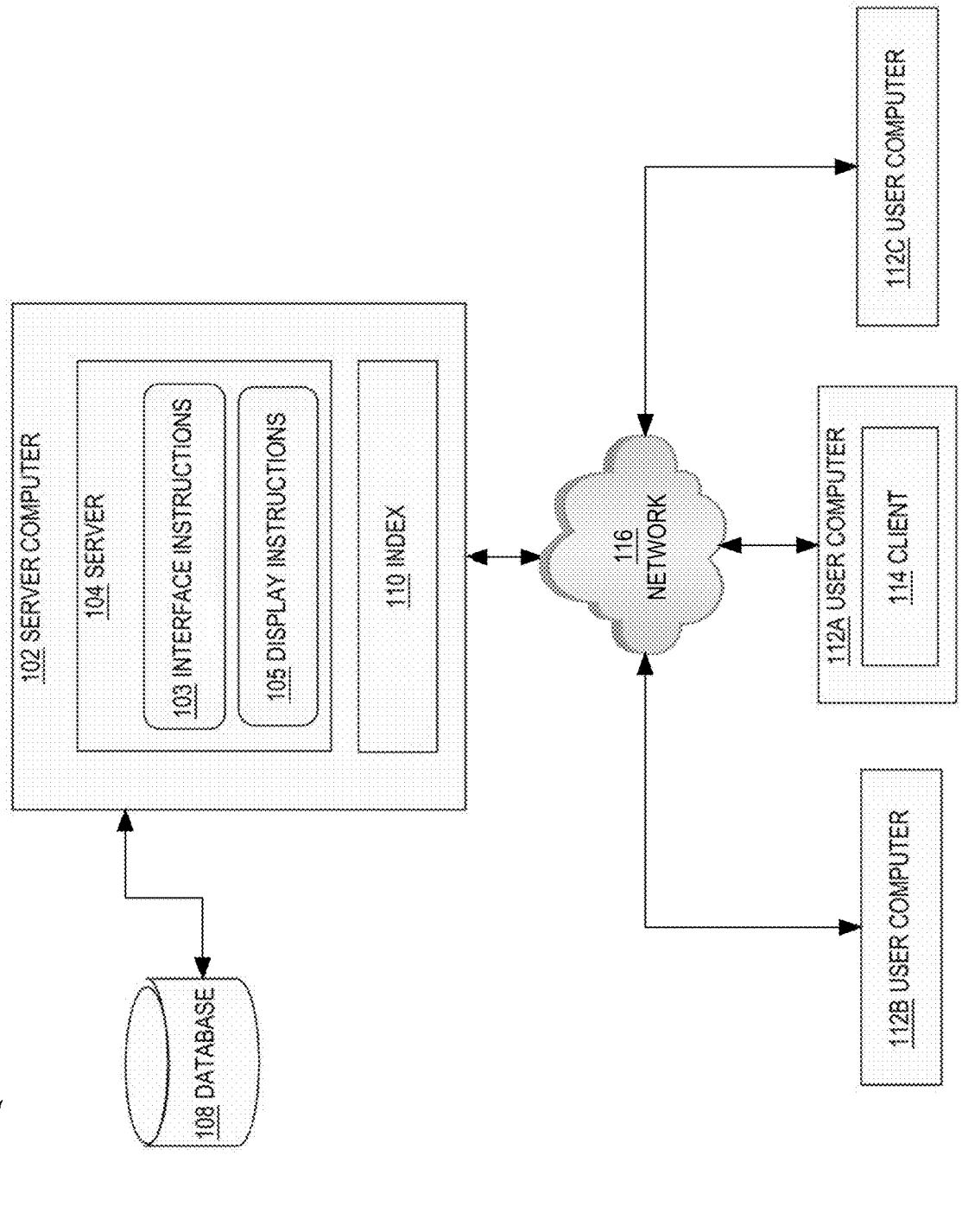
FIG. 1 illustrates a client server architecture for an example application system that could be used with the present disclosure, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
    2.0 STRUCTURAL OVERVIEW
    3.0 FUNCTIONAL OVERVIEW
    4.0 PROCEDURAL OVERVIEW
    5.0 HARDWARE OVERVIEW

1.0 General Overview

According to various embodiments, methods and systems are provided that enable improved computer efficiency and decreased use of computer processing cycles while detecting method calls and any associated errors. Specifically, the present approach uses an exception handler that is thrown when an application makes a method or function call using a main processing thread. The exception handler collects stack trace data during the call or request as a request-bound object and exceptions are passed to a background processing thread where a compressed weighted trie is generated. Once the request is complete, the complete and compressed weighted trie is stored. This approach has the technical benefit of increasing computer processing efficiency by copying the existing stack trace data as memory registers in the Central Processing Unit (CPU). Copying the CPU instruction location registers is computationally inexpensive, but the expansion form instruction location registers to human-readable source code is very expensive. This approach also has the technical benefit of reducing the uses of computer processing cycles required for the request to complete by processing exceptions and generating trie data structures using a background processing thread. Moreover, the compressed weighted trie may be used to identify errors instead of conducting resource-intensive searches using the main processing thread.

In an embodiment, a computer-implemented method for improving computer processing efficiency comprises, using a main processing thread, in response to detecting an error in one or more function calls, tracing the one or more function calls at runtime and collecting stack trace data. The method further comprises, using a background processing thread, generating and displaying a function call tree based on the stack trace data.

The method may also comprise compressing the stack trace data by removing stack lines that are common to all stacks and/or only printing out a filename and line number. In an embodiment, the function call tree may be a weighted call trie. In an embodiment, tracing the one or more function calls at runtime is performed by an exception handler. In an embodiment, generating the stack trace data comprises generating a request-bound object, and generating and displaying the function call tress is based on the request-bound object. In an embodiment, the function call comprises a database query, a cache call, and/or a service call.

2.0 Structural Overview

FIG. 1 illustrates a networked computer system in an example embodiment. In an embodiment, a computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between a programmed server computer 102 and user computers 112A, 112B, 112C. Therefore, each of elements 102, 112A, 112B, and 112C of FIG. 1 may represent one or more computers that host or execute stored programs that provide the functions and operations that are described further herein in connection with an issue tracking system or ITS.

Generally speaking, an ITS is a distributed computer system that is programmed and used to manage work items or "issues". Example ITSs include JIRA, JIRA Service Desk and JIRA Software which are commercially available from Atlassian Pty Ltd., Sydney, Australia. ITSs are deployed in a wide variety of applications including organizational support, customer call centers and for software development teams to use in project management and bug tracking. The solution represented in this disclosure is described, merely for convenience, in connection with an ITS but the solution is independent of the particular underlying application and can be used to detect method calls that cause performance issues in any kind of application. Thus, the ITS context presented in this disclosure is given merely to show one possible implementation example but not to limit the applicability of the solution.

FIG. 1 illustrates a single server implementation of an ITS 100. ITS 100 comprises a server computer 102. Server computer 102 hosts an ITS server 104 for providing server-side ITS functionality. The ITS server 104 comprises one or more application programs, libraries, APIs or other software elements that implement the features and functions that are further described herein.

Server computer 102 also stores or has access to ITS data. ITS data generally includes: ITS metadata defining the operation of the ITS (for example, issue type definitions, issue workflows, user permissions and the like); and issue data (i.e. data in respect of issues that have been entered into, and are being maintained by, the ITS). In this example ITS data is stored on and managed by a database 108, though it could be alternatively stored, for example on a local file system of the server computer 102. Database 108 is provided by a database server which may be hosted by server 102 but will more typically be hosted on a separate physical computer in communication (directly or indirectly via one or more networks) with ITS server computer 102.

Figure 2:
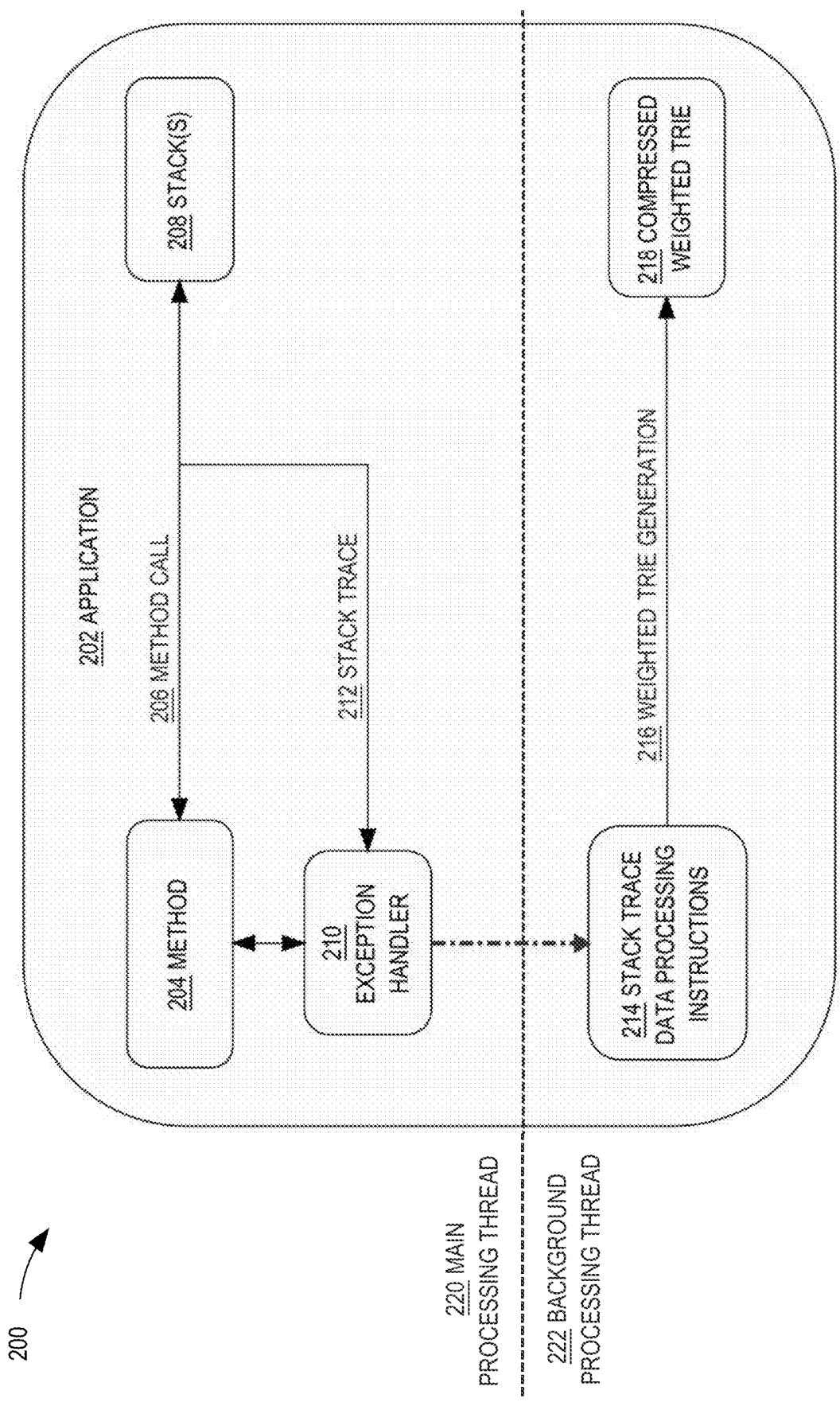
FIG. 2 illustrates a stack trace using an exception handler, in an example embodiment.

Interface instructions 103 is illustrated in FIG. 2 as being integrated into ITS Server 104, however it will be noted that the instructions could be implemented as a separate unit elsewhere in the network. Interface instructions 103 may retrieve development status information from a SCM system. The retrieved information is then processed in accordance with a methodology so as to be suitably integrated into the various workflows created on the ITS 100.

As noted above, ITS 100 also comprises a user computer 112. ITS user computer 112 hosts an ITS client 114 which provides client-side ITS functionality. Display instructions 105 included on ITS Server is configured to generate displays of the ITS data on user computers 112 in accordance with the routines programmed into server computer 102. A user interface is also displayed on client computers 112 for receiving user input, such as to define issues and workflows.

In an embodiment, an ITS client 114 may be a general web browser application (such as, for example, Chrome, Safari, Internet Explorer, Opera). In this case the client 114 accesses the ITS server 104 via an appropriate uniform resource locator (URL) and communicates with the ITS server 104 using general world-wide-web protocols (e.g. http, https, ftp). The web browser application is configured to request, render and display electronic documents that conform to a markup language such as HTML, XML or extensions, and may be capable of internally executing browser-executable code such as JAVASCRIPT, VBScript, or other forms of code. Where the ITS client 114 is a web browser, the ITS server 104 will be a web server (such as, for example, Apache, IIS, nginx, GWS).

Alternatively, the ITS client 114 may be a specific application programmed to communicate with server 102 using defined application programming interface (API) calls. In this case the ITS server 104 will be a specific application server configured to interact with the ITS client application.

A user computer 112 may host more than one ITS client 114 (for example a general web browser client and a specific application client). Similarly, server computer 102 may host more than one ITS server 104.

The ITS server computer 102 may serve multiple user computers 112 (or, more specifically, multiple ITS clients 114). In FIGS. 1 and 2, three user computers have been depicted (112A, 112B, and 112C), though more or fewer could be used.

The server computer 102 and client computer 112 communicate data between each other either directly or indirectly through one or more communications networks 116. Network 116 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 116 and the disclosure presumes that all elements of FIG. 1 are communicatively coupled via network 116. The various elements depicted in FIG. 1 may also communicate with each other via direct communications links that are not depicted in FIG. 1 for purposes of explanation.

In this case, ITS 100 may be implemented as an on-premises solution in which the server computer 102 and user computer 106 are associated with the same business enterprise and at least the server computer 102 is within an enterprise-controlled facility that is protected from open internetworks using firewalls or other security systems. In another embodiment, network 116 may represent a public internetwork and the server computer 102 may be located off-premises with respect to an organization, such as in a shared data center or cloud computing facility.

While a single server client-server architecture has been described above, an ITS may be implemented using alternative architectures. For example, in certain cases a clustered architecture may be used where multiple server computing instances (or nodes) are instantiated to meet system demand. Conversely, in the case of small enterprises with relatively simple requirements an ITS may be a stand-alone implementation (i.e. a single computer directly accessed/used by the end user).

The type(s) of issues handled by an ITS can vary greatly depending on the scenario in which the ITS is implemented. In a software development scenario, however, "issues" may for example be bugs, features currently under development, and/or features intended for future development. Many alternative implementations and types of issues are possible.

In order to manage issues, an ITS maintains metadata (for example in a relational database) which defines various operational parameters. ITS metadata can include, for example: one or more issue type definitions, each issue type definition defining a field scheme or field configuration for issues of that type (e.g. the possible fields or data to be maintained by the ITS for issues of a given type); one or more workflow definitions, a workflow definition defining the workflow that applies to an issue of a particular type (e.g. the states an issue can take and the manner in which an issue transitions between those states over its lifecycle); and user permissions (e.g. which users may create issues, view issues, amend issues, change the states of issues etc.). In some cases, the ITS may allow the user to change the metadata—e.g. to define new/different issue types, issue type definitions, and/or workflows.

The actual fields defined with respect to an issue type will depend on the requirements of a given ITS implementation. By way of example an issue type definition may define the following fields: a project field storing a project to which an issue belongs; a key field storing a unique identifier for an issue; a description field storing a description of an issue and actions taken with respect to the issue; a status field indicating the stage an issue is currently at in its lifecycle; an assigned person field indicating who (if anyone) an issue has been assigned to; a severity field storing the severity of an issue (e.g. critical, major, minor, etc.); a priority field storing the priority of an issue at a general level (e.g. very high, high, medium, low, very low); and a rank field storing a rank value in respect of an issue (defining a rank order of the issue relative to other issues).

In order to create and progress issues in ITS 100, users interact with appropriate user interfaces provided by an ITS client 114. For example, a user may create a new issue and provide relevant information in respect of the issue (e.g. a particular project the issue is associated with, a description, a priority, any other relevant information catered for). The ITS 100 itself will typically generate an issue key that can be used to uniquely identify the issue, which may be hidden from or visible to the user. Once an issue has been created, a user can interact with it, for example by adding additional information to the issue (e.g. in an issue description or other field), changing the state of the issue (e.g. from in progress to resolved), assigning the issue to another person (e.g. by changing an assigned person field).

3.0 Functional Overview

Embodiments provide computer-implemented processes to monitor the frequency of execution of a particular method, subroutine, function or other element of a computer program. An exception handler may be used to obtain values from the instruction registers that can be later used to get the entire call stack in a human readable manner. Existing techniques may be improved upon by using an exception handler to trace stack data during a method call and then using a background thread for processing the stack data into a weighted trie data structure that can be used to identify performance issues without using the main processing thread.

FIG. 2 illustrates a stack trace 200 using an exception handler, in an example embodiment. In the example of FIG. 2, a computing device may run an application 202. The application may be one or more software programs, such as client 114 running on user computer 112A or an application running on ITS server 104. In running the application 202, the computing device may execute one or more computing functions or methods 204, which makes one or more function calls or method calls 206 to a stack 208 data structure located in memory. In an embodiment, the stack 208 may be located in Random Access Memory (RAM), for example. In an embodiment, the method call 206 may be a database query, a service call, a cache call, or any other type of function call.

In an embodiment, an exception handler 210 that is associated with the method 204 is thrown at runtime, which is the point of initiating the call or request. In an embodiment, the exception handler 210 may be written as code within the method itself, while in other embodiments, the exception handler 210 is written as separate code associated with the method 204.

During the request runtime, the exception handler 210 initiates a stack trace 212 to collect then-current stack data as memory registers in the CPU. This allows for near-instantaneous processing because the stack data is being collected within the CPU itself, specifically the CPU cache memory, rather than from an external memory source. The exception handler 210 then passes the data, which is held in a request-bound object, to stack trace data processing instructions 214 for processing using a background processing thread 222. This allows for a more efficient pathway into the processor by not blocking the main processing thread. The stack trace data processing instructions 214 translates from the machine instruction registers to a human readable stack trace using the symbol mapping between instruction registers and JAVA symbols, for example, and initiates weighted trie generation 216. In an embodiment, when the request or call 206 is completed, the stack trace data processing instructions 214 may store a completed and compressed weighted call trie.

4.0 Procedural Overview

FIG. 3 illustrates a method or algorithm 300 for improving method call detection using stack traces, in an embodiment.

In one embodiment, a method or algorithm 300 starts at step 302, where a main processing thread is used to trace one or more function calls at runtime and collect stack trace data in response to detecting an error in the one or more function calls. Specifically, when a function or method 204 is executed, one or more function calls, such as the method call 206 of FIG. 2, is initiated. If an error in the method 204 or method call 206 is detected, an associated exception handler 210 is thrown. For example, the method 204 itself may be configured to throw an exception handler 210 when an error occurs. In an embodiment, the exception handler 210 conducts a stack trace 212 that collects stack trace data based on the stacks 208 using the same main processing thread 220 as the method call 206.

At step 304, the method further comprises generating and displaying a function call tree based on the stack trace data. In an embodiment, once the exception handler 210 collects the stack trace data, the exception handler 210 passes the collected stack trace data to stack trace data processing instructions 214, which processes the data using a background processing thread. The stack trace data processing instructions 214 may generate a trie, or a digital tree, which is an ordered tree data structure using the stack trace data. The trie may be weighted such that, given a list of parameters and/or weights for those parameters, top matches may be found. For example, parameters may be weighted based on how many times an error has been detected. In an embodiment, the stack trace data processing instructions 214 may also compress or reduce the stack trace data by deleting excessive information, such as removing common stack lines, and/or printing only a limited number of identifiers, such as printing only a filename and line number. This compression or reduction may result in a completed weighted call trie. In an embodiment, the stack trace data processing instructions 214 or a separate set of displaying instructions may display the completed weighted call trie in a graphical user interface (GUI) of a computing device. The completed weighted call trie may subsequently be used to identify the location of certain errors in real time or close to real time. For example, when a user views an issue using a browser, a log will be emitted outlining where in the code every remote service request is executed, and the lines of code leading up to that point in time.

Using the foregoing techniques, programmed computers may be used to identify method calls in a manner that increases computer processing efficiency. Implementations provide for increased processing efficiency by using an event handler to collect stack trace data and holding it as a request-bound object in the CPU's cache memory. This allows for near instantaneous access to and processing of the stack trace data with minimal impact on performance of a request.

Furthermore, the approaches disclosed herein improve processor efficiency by processing the stack trace data using a background processing thread instead of the main processing thread. This allows for a more efficient pathway into the processor by not blocking the main processing thread.

5.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, meters, sensors, and any other electronic device that incorporates hard-wired and/or program logic to implement the described techniques, one or more virtual computing machines or instances in a data center, and/or a network of server computers and/or personal computers.

Figure 4:
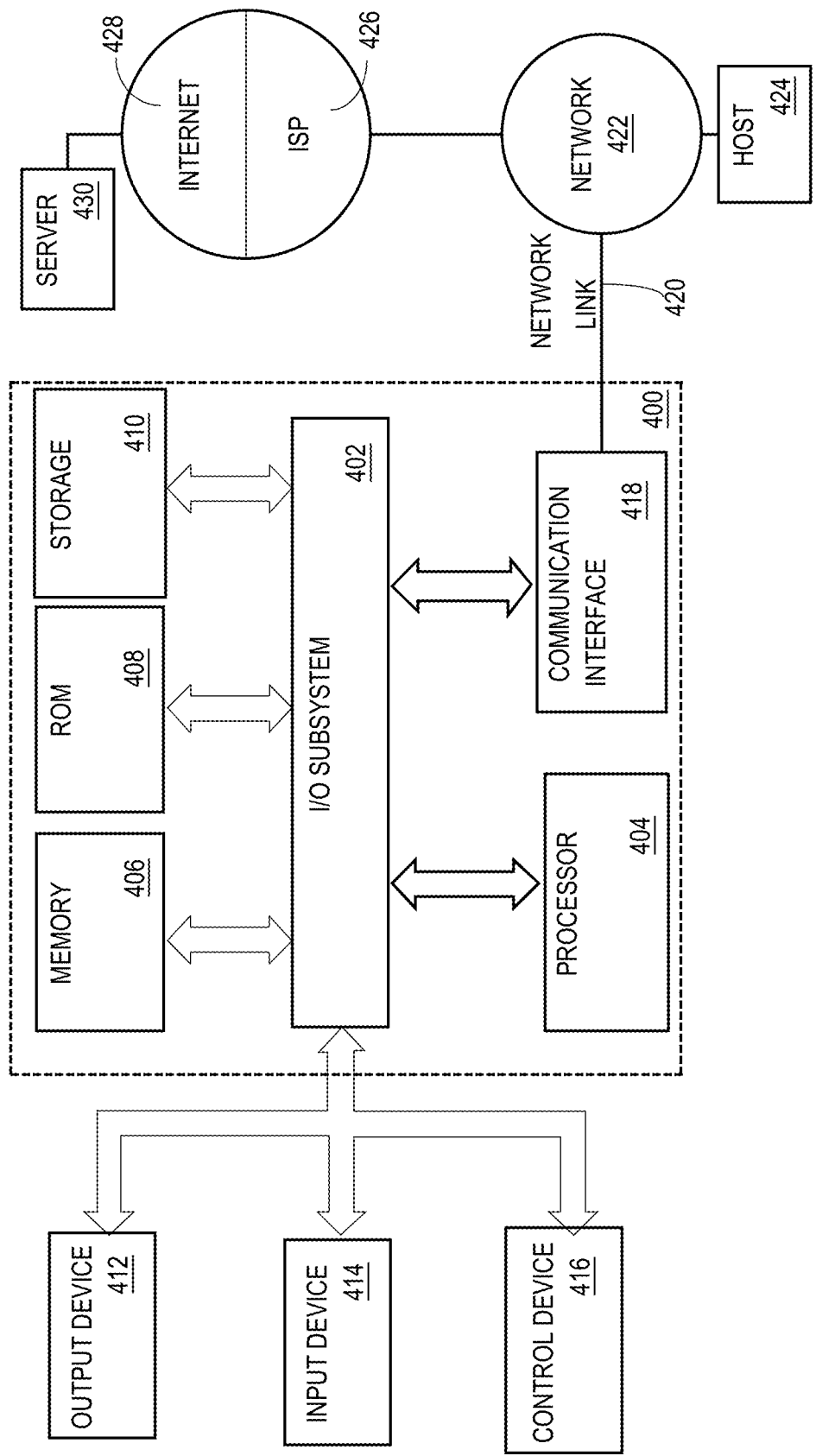
FIG. 4 illustrates a computer system upon which an embodiment of the invention may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 404 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as instructions, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL), no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method for improving computer processing efficiency, comprising:
    using a main processing thread, in response to detecting the execution of one or more function calls, tracing the one or more function calls at runtime and collecting stack trace data, wherein collecting the stack trace data comprises generating a request-bound object;
    using a background processing thread, generating and displaying a function call tree based on the request-bound object and the stack trace data.

2. The method of claim 1, further comprising compressing the stack trace data by removing common stack lines or printing a filename and line number.

3. The method of claim 1, wherein displaying the function call tree comprises displaying a weighted call trie.

4. The method of claim 1, wherein tracing the one or more function calls at runtime is performed by an exception handler.

5. The method of claim 1, wherein the one or more function calls comprise a database query or a service call.

6. The method of claim 1, wherein the one or more function calls comprise a cache call.

7. The method of claim 1, wherein the one or more function calls comprise any of a database query, a service call or a cache call.

8. One or more non-transitory computer-readable storage media storing one or more instructions which, when executed by one or more computing devices, cause:
    using a main processing thread, in response to detecting an error in one or more function calls, tracing the one or more function calls at runtime and collecting stack trace data, wherein tracing the one or more function calls comprises generating a request-bound object;
    using a background processing thread, generating and displaying a function call tree based on the request-bound object and the stack trace data.

9. The one or more non-transitory computer-readable storage media of claim 8, further comprising one or more additional instructions which, when executed by the one or more computing devices, cause:
    compressing the stack trace data by removing common stack lines or printing a filename and line number.

10. The one or more non-transitory computer-readable storage media of claim 8, wherein displaying the function call tree comprises displaying a weighted call trie.

11. The one or more non-transitory computer-readable storage media of claim 8, wherein tracing the one or more function calls at runtime is performed by an exception handler.

12. The one or more non-transitory computer-readable storage media of claim 8, wherein the one or more function calls comprise a database query, a service call, or a cache call.

13. A computer system providing an improvement in computer processing efficiency, the system comprising:
    one or more processors; and
    one or more memories communicatively coupled to the one or more processors and storing instructions which, when processed by the one or more processors, cause:
        using a main processing thread, in response to detecting an error in one or more function calls, tracing the one or more function calls at runtime using an exception handler and collecting stack trace data using the exception handler, wherein collecting the stack trace data comprises generated a request-bound object;
        using a background processing thread, generating and displaying a function call tree based on the request-bound object and the stack trace data.

14. The computer system of claim 13, wherein one or more memories further store additional instructions which, when processed by the one or more processors, cause:
    compressing the stack trace data by removing common stack lines or printing a filename and line number.

15. The computer system of claim 13, wherein displaying the function call tree comprises displaying a weighted call trie.

16. The computer system of claim 13, wherein the one or more function calls comprise any of a database query, a service call or a cache call.

17. A computer-implemented method for improving computer processing efficiency, comprising:
    using an exception handler executing in a main processing thread, in response to detecting the execution of one or more function calls, tracing the one or more function calls at runtime and collecting stack trace data by generating a request-bound object, and wherein generating and displaying the function call tree is based on the request-bound object;
    compressing the stack trace data by removing common stack lines or printing a filename and line number
    using a background processing thread, generating and displaying a function call tree as a weighted call trie that is based on the stack trace data.

* * * * *